(12) United States Patent
Pittman et al.

(10) Patent No.: US 11,281,848 B2
(45) Date of Patent: Mar. 22, 2022

(54) SYSTEM AND METHOD FOR AUTOMATING THE CREATION OF A RENDERABLE DESIGN

(71) Applicant: CustomInk, LLC, Fairfax, VA (US)

(72) Inventors: Ryan J. Pittman, Fairfax, VA (US); Miranda Shennan Wang, Vienna, VA (US); Jazzmyn Adriana Howington, Fairfax, VA (US); Jason James Campos, Washington, DC (US)

(73) Assignee: CustomInk, LLC, Fairfax, VA (US)

( * ) Notice: Subject to any disclaimer, the term of this patent is extended or adjusted under 35 U.S.C. 154(b) by 0 days.

(21) Appl. No.: 16/860,979

(22) Filed: Apr. 28, 2020

(65) Prior Publication Data

US 2021/0049319 A1    Feb. 18, 2021

Related U.S. Application Data

(63) Continuation of application No. 15/631,969, filed on Jun. 23, 2017, now abandoned.

(51) Int. Cl.
*G06F 3/048*      (2013.01)
*G06F 40/163*     (2020.01)
*G06F 3/0482*     (2013.01)
*G06F 40/106*     (2020.01)

(52) U.S. Cl.
CPC .......... *G06F 40/163* (2020.01); *G06F 3/0482* (2013.01); *G06F 40/106* (2020.01)

(58) Field of Classification Search
None
See application file for complete search history.

(56) References Cited

U.S. PATENT DOCUMENTS

| 7,203,660 | B1* | 4/2007 | Majeed | G06Q 30/0633 |
| | | | | 705/14.1 |
| 2002/0133521 | A1* | 9/2002 | Campbell | G06F 40/10 |
| | | | | 715/256 |
| 2003/0137522 | A1 | 7/2003 | Kaasila et al. | |
| 2004/0194028 | A1 | 9/2004 | O'Brien | |

OTHER PUBLICATIONS

"Retype: The next level typography photo editor", [retrieved from the internet Dec. 12, 2017] retrieved from: http://sumoing.com/apps/retype.
PCT International Search Report and Written Opinion regarding PCT Patent Application No. PCT/US18/38521, dated Aug. 30, 2018.

* cited by examiner

*Primary Examiner* — Thanh T Vu
(74) *Attorney, Agent, or Firm* — Jordan A. Sigale; Vedder Price P.C.

(57) ABSTRACT

A system and method for creating a renderable design is disclosed having a host system in communication with a user device. The host system generates instructions that cause the user device to display screens of an application in a browser, the application screens being configured to accept input from a user. Upon receiving a text string input by the user, the host system evaluates each layout stored in a database to generate and return at least one possible layout representing a design configuration for the text string input by the user and sends the possible layout to the user device. Upon receiving confirmation of a selection of at least one layout, the host system generates a renderable design of the selected layout.

12 Claims, 10 Drawing Sheets

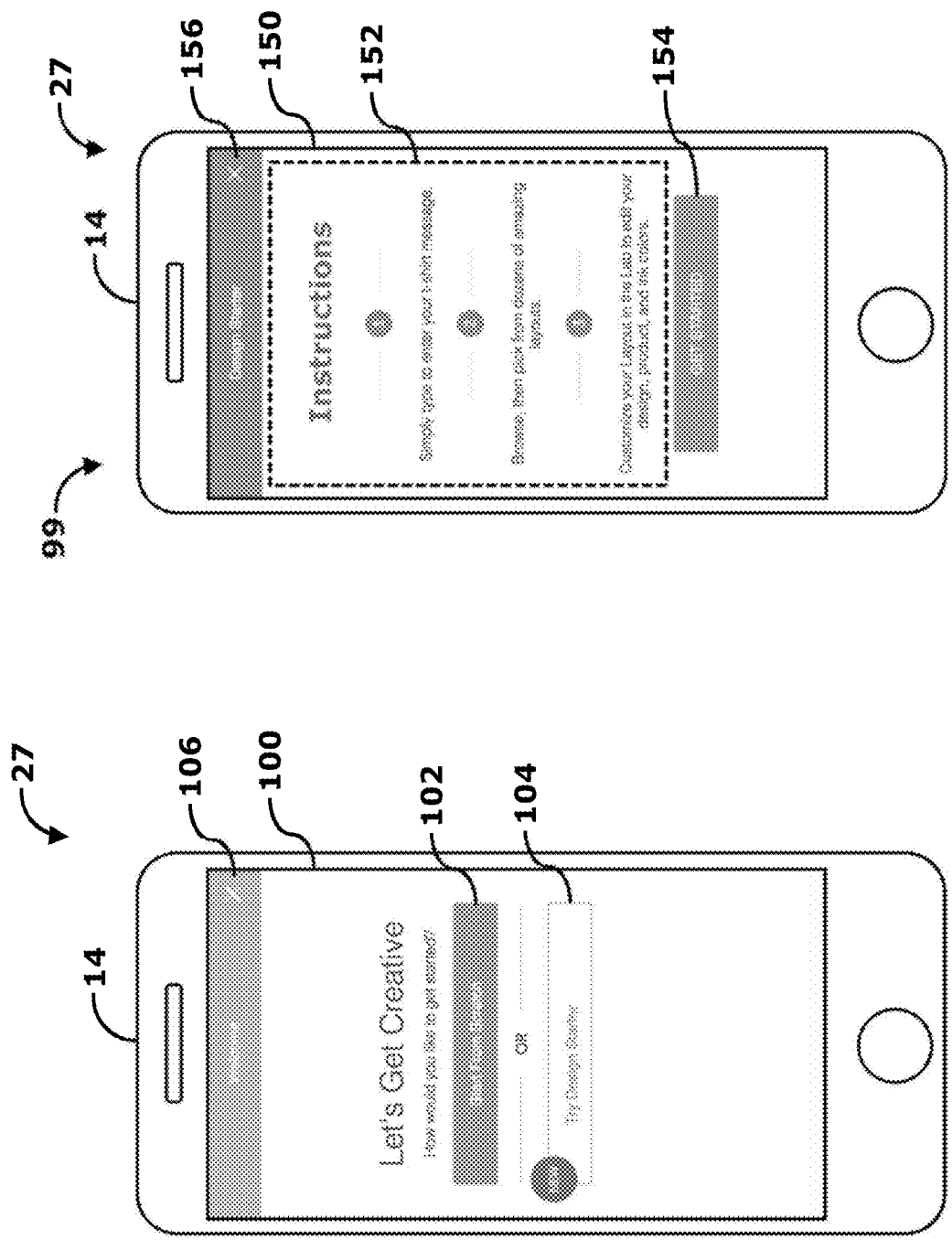

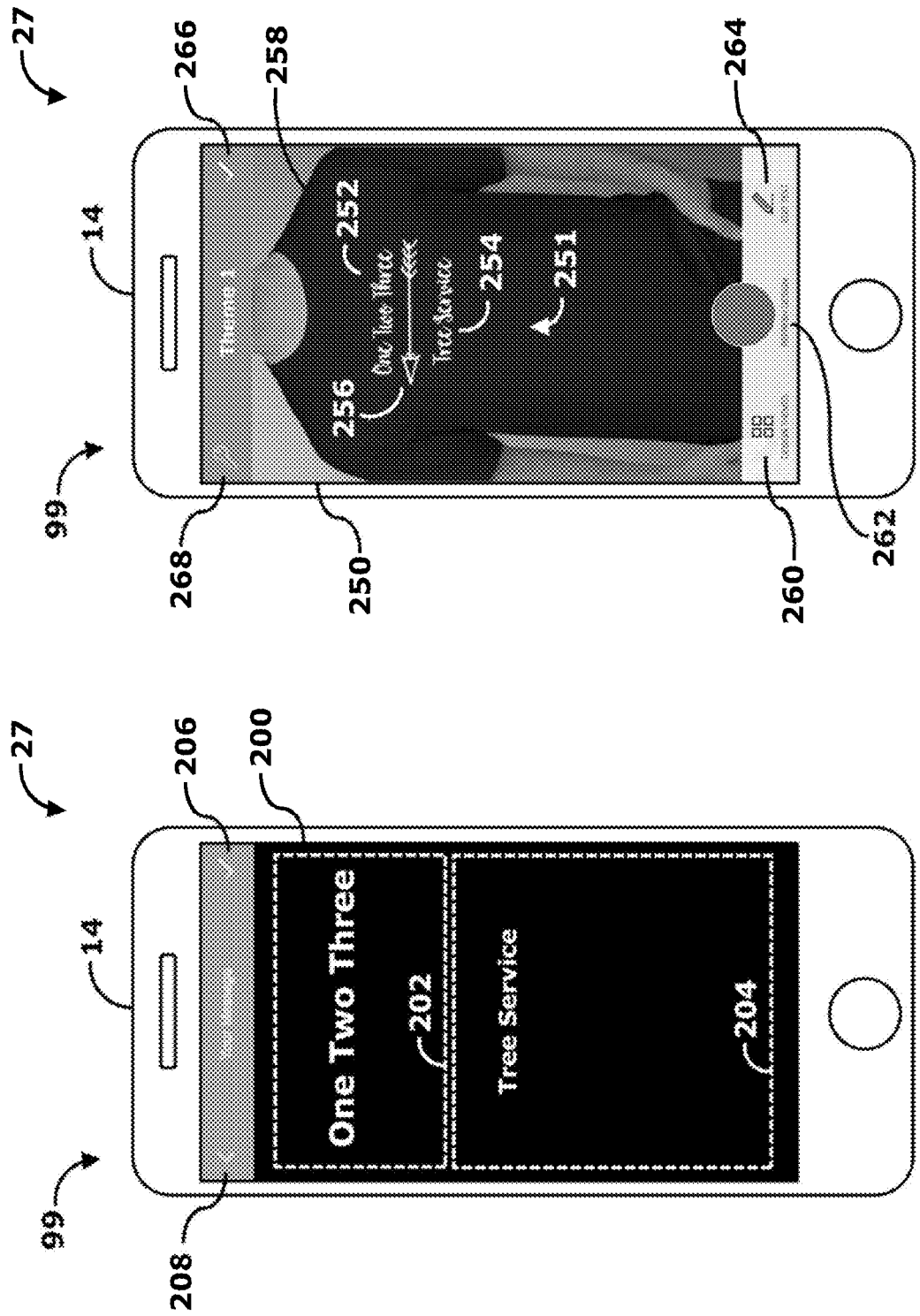

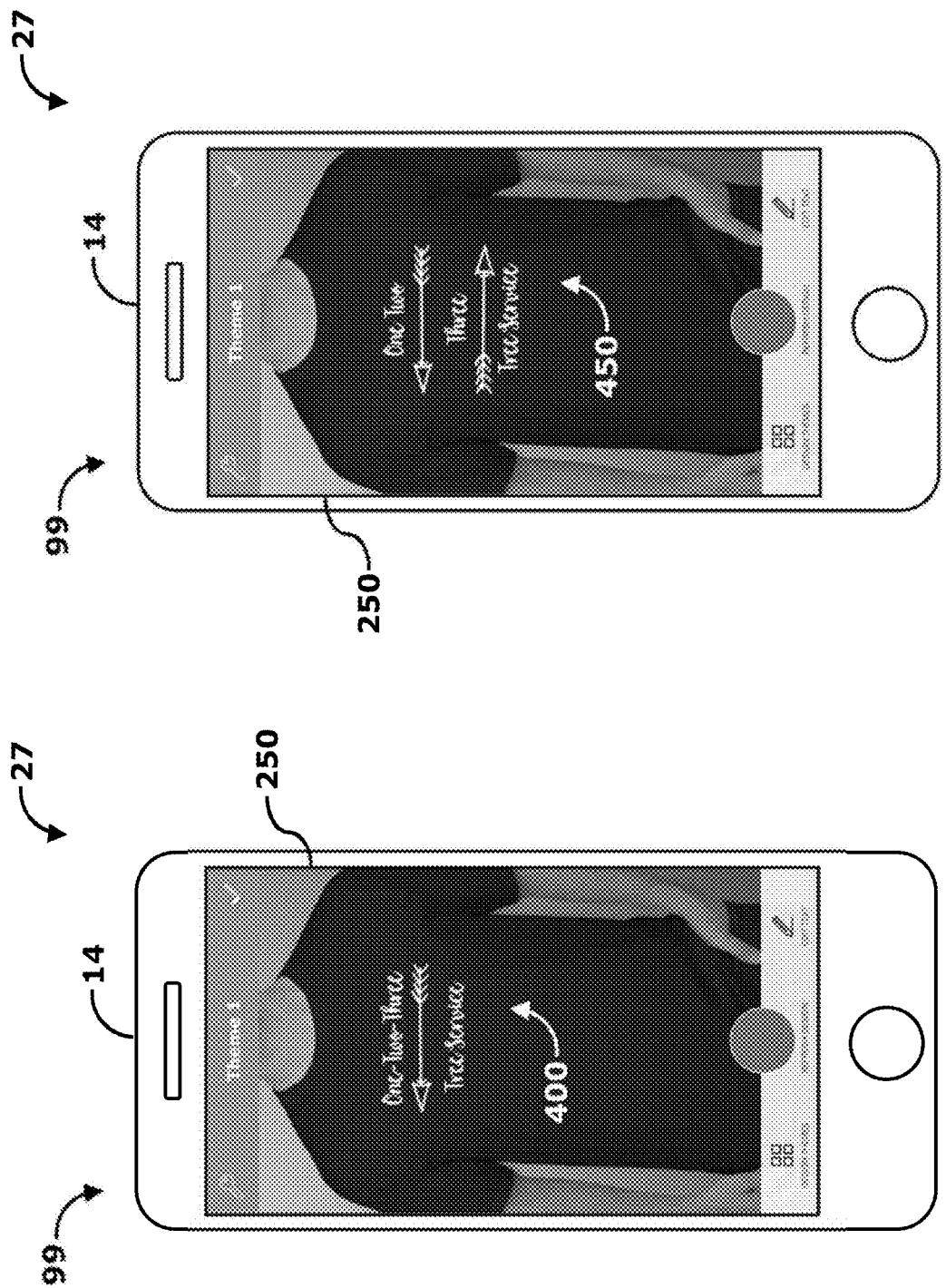

SYSTEM AND METHOD FOR AUTOMATING THE CREATION OF A RENDERABLE DESIGN

CROSS REFERENCE/INCORPORATION BY REFERENCE

The present application is a continuation of and claims priority to U.S. patent application Ser. No. 15/631,969 filed Jun. 23, 2017. The entire contents of the patent application referenced above is hereby incorporated by reference herein in its entirety.

BACKGROUND

Designing a renderable configuration of graphics and text from scratch on a small form-factor device can be very frustrating for users, especially users who are not familiar with design processes. The task of creating all of the elements of a design and organizing them in an appealing fashion, especially on a small form-factor device, can be so daunting that the user either gets frustrated and doesn't finish a design, or the user never begins.

A need exists therefore, for a system and method that simplifies the process of starting a design for a renderable configuration of graphics and text to encourage a user to invest sufficient time and creativity to establish at least the beginnings of a design, if not even an ultimate design. It is to such a system and method that the presently disclosed inventive concepts are directed.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 4 is an illustration of an exemplary welcome screen in accordance with some embodiments of the present disclosure.

FIG. 5 is an illustration of an exemplary instruction screen in accordance with some embodiments of the present disclosure.

FIG. 6 is an illustration of an exemplary input screen in accordance with some embodiments of the present disclosure.

FIG. 7 is an illustration of an exemplary layout screen in accordance with some embodiments of the present disclosure.

FIG. 13 is an illustration of an exemplary layout screen displaying an exemplary layout of user input text in accordance with some embodiments of the present disclosure.

FIG. 14 is an illustration of an exemplary layout screen displaying another exemplary layout of user input text in accordance with some embodiments of the present disclosure.

DETAILED DESCRIPTION

Figure 1:
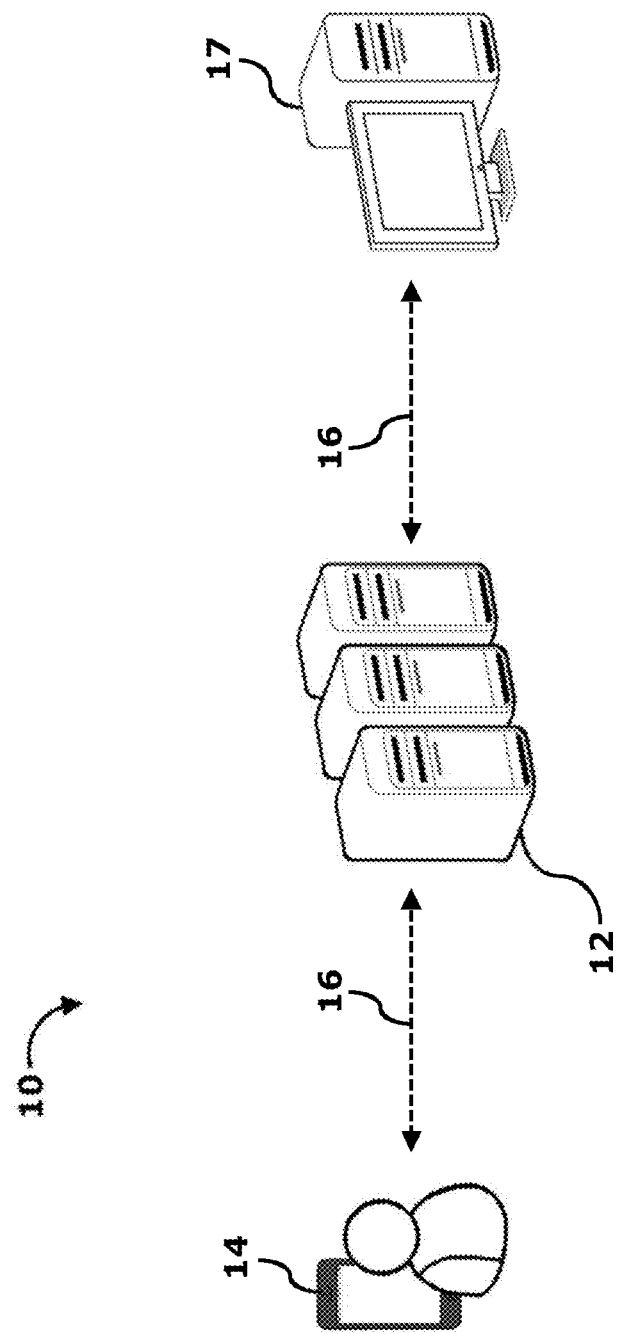
FIG. 1 is a diagrammatic view of hardware forming an exemplary embodiment of a system for designing a renderable configuration of graphics and text constructed in accordance with the present disclosure.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, a design refers to a renderable configuration of graphics and text.

Assisted design, as used herein, refers to a design which is made using a design starter module 99 which automatically creates at least a portion of a design such as selecting a theme, graphical elements, and/or a layout, thus assisting the user in creating a new design.

As used herein, the term layout refers to a construct that groups a collection of breakpoints, typically under a similar aesthetic, e.g., with a specific arrangement of text and/or imagery. It should be noted, that it is contemplated that certain layouts may be created specifically for a size or length of the text string input by the user. For instance, certain layouts may be created having an aesthetic designed to be appealing with long text strings and certain layouts may be created having an aesthetic designed to be appealing with short text strings.

Breakpoints, as used herein, references collections of text elements, graphical elements, text sections, and design element sections which can be assembled for rendering purposes. Breakpoints provide the information and capability necessary for generating the configuration required to render a design. Each breakpoint may be provided with a size designation which is used by the process described herein to determine which layouts will work with text input by a user as will be described further herein. For instance, size designations may include, but are not limited to x-small, small, medium, large, x-large, xx-large. Each size designation may include, for instance, a maximum number of characters and/or individual text elements that will fit in the breakpoint.

As used herein, text section refers to an area of a design that accommodates text, the area having a character limit and additional configuration information necessary to render a design such as placement, font-size, and font-face.

As used herein, a design element section refers to an area of a design that specifies a graphic decoration, which may be a reference to a graphic and/or graphical elements such as lines or shapes, as well as color, placement, and size of the graphic and/or the graphical elements. The reference may be a link, a URL, or any other mechanism for designating the logical location of the graphic and/or graphical elements in a manner that the graphic and/or graphical elements may be accessed by the process to render the graphic and/or graphical element.

New line, as used herein, refers to a control character or mechanism used to return a device's position to the beginning of a new line of text.

Referring now to the figures, and in particular to FIG. 1, shown therein is a diagrammatic view of hardware forming an exemplary embodiment of a system 10 for designing a renderable configuration of graphics and text constructed in accordance with the present disclosure.

The system 10 is provided with at least one host system 12 (hereinafter "host system 12"), a plurality of user devices 14 (hereinafter "user device 14"), and a network 16. In some embodiments, the system 10 may include at least one external system 17 (hereinafter "external system 17") for use by an administrator to add, delete, or modify user information, add themes, manage available garment types colors and sizes, etc. The system 10 may be a system or systems that are able to embody and/or execute the logic of the processes described herein. Logic embodied in the form of software instructions and/or firmware may be executed on any appropriate hardware. For example, logic embodied in the form of software instructions and/or firmware may be executed on a dedicated system or systems, on a personal computer system, on a distributed processing computer system, and/or the like. In some embodiments, logic may be implemented in a stand-alone environment operating on a single computer system and/or logic may be implemented in a networked environment such as a distributed system using multiple computers and/or processors as depicted in FIG. 1, for example.

The host system 12 of the system 10 may include a single processor or multiple processors working together or independently to perform a task. In some embodiments, the host system 12 may be partially or completely network-based or cloud based. The host system 12 may or may not be located in single physical location. Additionally, multiple host systems 12 may or may not necessarily be located in a single physical location.

In some embodiments, the system 10 may be distributed, and include at least one host system 12 communicating with one or more user device 14 via the network 16. As used herein, the terms "network-based," "cloud-based," and any variations thereof, are intended to include the provision of configurable computational resources on demand via interfacing with a computer and/or computer network, with software and/or data at least partially located on a computer and/or computer network.

In some embodiments, the network 16 may be the Internet and/or other network. For example, if the network 16 is the Internet, a primary user interface of the system 10 may be delivered through a series of web pages or private internal web pages of a company or corporation, which may be written in hypertext markup language. It should be noted that the primary user interface of the system 10 may be another type of interface including, but not limited to, a Windows-based application, a mobile device based application, a mobile web interface, and/or the like.

The network 16 may be almost any type of network. For example, in some embodiments, the network 16 may be a version of an Internet network (e.g., exist in a TCP/IP-based network). It is conceivable that in the near future, embodiments within the present disclosure may use more advanced networking technologies.

In some embodiments, the external system 17 may optionally communicate with the host system 12. For example, in one embodiment of the system 10, the external system 17 may supply data transmissions via the network 16 to the host system 12 regarding real-time or substantially real-time events (e.g., user updates, photographic or illustration image uploads, and/or available substrate information updates). Data transmission may be through any type of communication including, but not limited to, speech, visuals, signals, textual, and/or the like. Events may include, for example, data transmissions regarding user messages or updates initiated via the external system 17. It should be noted that the external system 17 may be the same type and construction as the user device 14.

Figure 2:
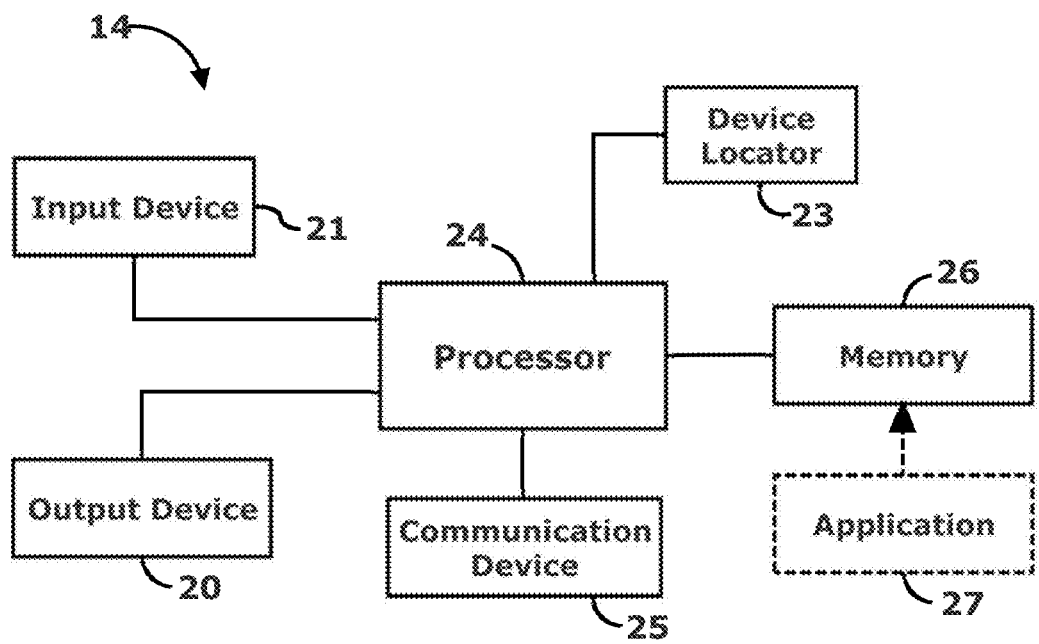
FIG. 2 is a diagrammatic view of an exemplary user device for use in the system for designing a renderable configuration of graphics and text illustrated in FIG. 1.

As shown in FIG. 2, the one or more user devices 14 of the system 10 may include, but are not limited to implementation as a personal computer, a cellular telephone, a smart phone, a network-capable television set, a tablet, a laptop computer, a desktop computer, a network-capable handheld device, a server, a digital video recorder, a wearable network-capable device, and/or the like. One particularly important use for the inventive program logic 34 is in association with a smart phone (or other small form-factor user device 14) because designing a renderable configuration of graphics and text on the small form-factor device can be very frustrating for users. Thus, many of the embodiments of the inventive systems and processes disclosed herein are primarily intended for use with a small form factor display (although as those of ordinary skill in the art having the present specification, drawings, and claims before them would readily understand that the inventive systems and processes would work on the larger form-factor displays, as well). The inventive program logic 34 simplifies the process of sufficiently starting a design for a renderable configuration of graphics and text to encourage a user to invest sufficient time and creativity to establish at least the beginnings of a design—if not even an ultimate design. Moreover, it is believed because of that user investment and the potentially appealing aesthetic of the resulting assisted designs that the system will be better able to obtain the user's email address such that the resulting design can be saved on the host system 12 to allow user subsequent access to the design from either a small or large form-factor user device 14. In this way, the user can access the design that they began substantially creating from any web-enabled device using the email that the server will send the input email address with a link to the design modification module 348.

In some embodiments, the user device 14 may include one or more input devices 18 (hereinafter "input device 18"), one or more output devices 20 (hereinafter "output device 20"), a device locator 23, one or more processors 24 (hereinafter "processor 24"), one or more communication devices 25 (hereinafter "communication device 25") capable of interfacing with the network 16, one or more non-transitory memory 26 (hereinafter "memory 26") storing processor executable code and/or software application(s), for example including, a web browser capable of accessing a website and/or communicating information and/or data over a wireless or wired network (e.g., network 16), and/or the like. The memory 26 may also store an application 27 that, when executed by the processor 24 causes the user device 14 to display a series of screens that will be described herein to assist a user with designing a designing a renderable configuration of graphics and text that may be printed, for instance, on a T-shirt.

Embodiments of the system 10 may also be modified to use any user device 14 or future developed devices capable of communicating with the host system 12 via the network 16.

The input device 18 may be capable of receiving information input from the user and/or processor 24, and transmitting such information to other components of the user device 14 and/or the network 16. The input device 18 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 20 may be capable of outputting information in a form perceivable by the user and/or processor 24. For example, implementations of the output device 20 may include, but are not limited to, a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary embodiments, the input device 18 and the output device 20 may be implemented as a single device, such as, for example, a touchscreen of a computer, a tablet, or a smartphone. It is to be further understood that as used herein the term user is not limited to a human being, and may comprise, a computer, a server, a website, a processor, a network interface, a human, a user terminal, a virtual computer, combinations thereof, and/or the like, for example.

The host system 12 may be capable of interfacing and/or communicating with the user device 14 and the external system 17 via the network 16. For example, the host system 12 may be configured to interface by exchanging signals (e.g., analog, digital, optical, and/or the like) via one or more ports (e.g., physical ports or virtual ports) using a network protocol, for example. Additionally, each host system 12 may be configured to interface and/or communicate with other host systems 12 directly and/or via the network 16, such as by exchanging signals (e.g., analog, digital, optical, and/or the like) via one or more ports.

The network 16 may permit bi-directional communication of information and/or data between the host system 12, the user device 14, and/or the external system 17. The network 16 may interface with the host system 12, the user device 14, and/or the external system 17 in a variety of ways. For example, in some embodiments, the network 16 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 16 may be implemented as the World Wide Web (or Internet), a local area network (LAN), a wide area network (WAN), a metropolitan network, a 4G network, a satellite network, a radio network, an optical network, a cable network, a public switch telephone network, an Ethernet network, combinations thereof, and the like, for example. Additionally, the network 16 may use a variety of network protocols to permit bi-directional interface and/or communication of data and/or information between the host system 12, the user device 14 and/or the external system 17.

Figure 3:
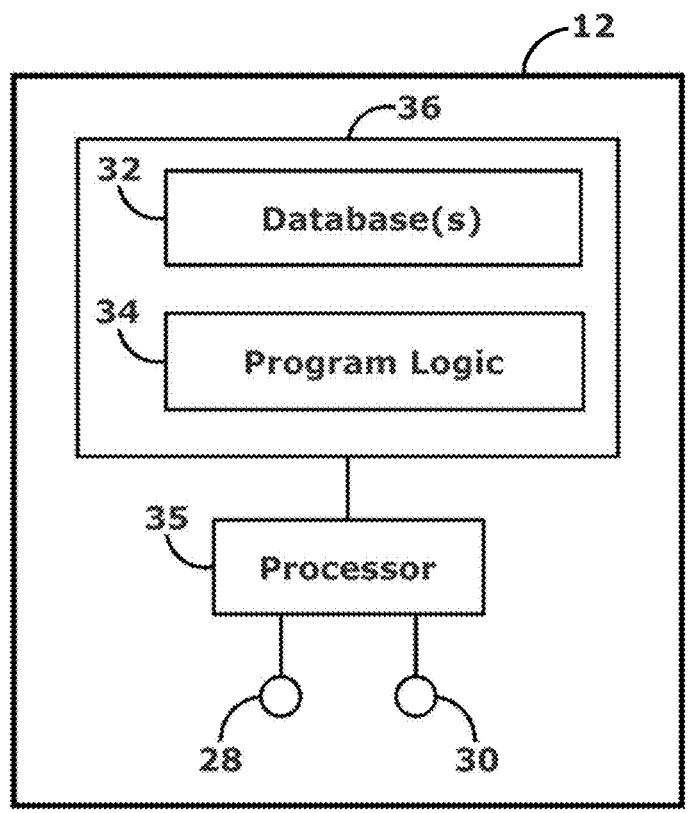
FIG. 3 is a diagrammatic view of an exemplary embodiment of a host system for use in the system for designing a renderable configuration of graphics and text illustrated in FIG. 1.

Referring now to FIG. 3, shown therein is a diagrammatic view of an exemplary embodiment of the host system 12. In the illustrated embodiment, the host system 12 is provided with one or more databases 32 (hereinafter "database 32"), program logic 34, and one or more processors 35 (hereinafter "processor 35"). The program logic 34 and the database 32 are stored on non-transitory computer readable storage memory 36 (hereinafter "memory 36") accessible by the processor 35 of the host system 12. It should be noted that as used herein, program logic 34 is another term for instructions which can be executed by the processor 24 or the processor 35. The database 32 can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 32 can be centralized or distributed across multiple systems.

In some embodiments, the host system 12 may comprise one or more processors 35 working together, or independently to, execute processor executable code stored on the memory 36. Additionally, each host system 12 may include at least one input device 28 (hereinafter "input device 28") and at least one output device 30 (hereinafter "output device 30"). Each element of the host system 12 may be partially or completely network-based or cloud-based, and may or may not be located in a single physical location.

The processor 35 may be implemented as a single processor or multiple processors working together, or independently, to execute the program logic 34 as described herein. It is to be understood, that in certain embodiments using more than one processor 35, the processors 35 may be located remotely from one another, located in the same location, or comprising a unitary multi-core processor. The processors 35 may be capable of reading and/or executing processor executable code and/or capable of creating, manipulating, retrieving, altering, and/or storing data structures into the memory 36.

Exemplary embodiments of the processor 35 may be include, but are not limited to, a digital signal processor (DSP), a central processing unit (CPU), a field programmable gate array (FPGA), a microprocessor, a multi-core processor, combinations, thereof, and/or the like, for example. The processor 35 may be capable of communicating with the memory 36 via a path (e.g., data bus). The processor 35 may be capable of communicating with the input device 28 and/or the output device 30.

The processor 35 may be further capable of interfacing and/or communicating with the user device 14 and/or the external system 17 via the network 16. For example, the processor 35 may be capable of communicating via the network 16 by exchanging signals (e.g., analog, digital, optical, and/or the like) via one or more ports (e.g., physical or virtual ports) using a network protocol to provide updated information to the application 27 executed on the user device 14 such as, for instance, predefined property information such as county assessment information for a property at or near the user's current location.

The memory 36 may be capable of storing processor executable code. Additionally, the memory 36 may be implemented as a conventional non-transitory memory, such as for example, random access memory (RAM), CD-ROM, a hard drive, a solid state drive, a flash drive, a memory card, a DVD-ROM, a disk, an optical drive, combinations thereof, and/or the like, for example.

In some embodiments, the memory 36 may be located in the same physical location as the host system 12, and/or one or more memory 36 may be located remotely from the host system 12. For example, the memory 36 may be located remotely from the host system 12 and communicate with the processor 35 via the network 16. Additionally, when more than one memory 36 is used, a first memory 36 may be located in the same physical location as the processor 35, and additional memory 36 may be located in a location physically remote from the processor 35. Additionally, the memory 36 may be implemented as a "cloud" non-transitory computer readable storage memory (i.e., one or more memory 36 may be partially or completely based on or accessed using the network 16).

The input device 28 of the host system 12 may transmit data to the processor 35 and may be similar to the input device 18 of the user device 14. The input device 28 may be located in the same physical location as the processor 35, or located remotely and/or partially or completely network-based. The output device 30 of the host system 12 may transmit information from the processor 35 to a user, and may be similar to the output device 20 of the user device 14. The output device 30 may be located with the processor 24, or located remotely and/or partially or completely network-based.

The memory 36 may store processor executable code and/or information comprising the database 32 and program logic 34. In some embodiments, the processor executable code may be stored as a data structure, such as the database 32 and/or data table, for example, or in non-data structure format such as in a non-compiled text file. The program logic 34, when executed by the processor 35 causes the host system 12 to generate instructions (sometimes referred to as code) and/or elements to be transmitted via the network 16 to the user device 14 to cause the browser to display a series of screens in a web application 27 (hereinafter "application 27") that will be described herein to assist a user with designing a renderable configuration of graphics and text that may be printed, for instance, on a T-shirt.

In FIGS. 4-11, an exemplary embodiment of the application 27 is shown displayed in the browser on the user device 14. As shown in FIGS. 4-11, the application 27 may be provided with a welcome screen 100, an instruction screen 150, an input screen 200, a layout screen 250, a theme selection screen 280, a customize screen 300, a save your design screen 320, and a customization screen 350.

In the embodiment shown in FIG. 4, the welcome screen 100 is provided with a new design button 102, a design starter button 104, and a close button 106. In such an embodiment, the user is provided with the option to create a new design from scratch by selecting the new design button 102, or, the user may choose to start their design using a design starter module 99 by selecting the design starter button 104. It should be noted that the term button, as used herein, is meant as a non-limiting example and refers to any graphical control element that provides the user with a way to trigger an event or to interact with interactive elements such as dialogue boxes.

In one embodiment of the application 27, selecting the design starter button 104 on the welcome screen 100 causes the user device 14 to send a signal via the network 16 to the host system 12 where, in response to receiving the signal, the program logic 34 generates instructions necessary to cause the application 27 to display the instruction screen 150 and causes the host system 12 to send the instructions as a signal via the network 16 to the user device 14 where the application 27 parses the instructions and displays the instruction screen 150. As illustrated in FIG. 5, the instruction screen 150 may be provide with an instruction section 152, a get started button 154, and a close button 156. The instruction section 152 may be provided with information regarding the process they will follow using the design starter module 99. The information provided in the instruction section 152 provides the context necessary to inform the user that the design starter module 99 automates foundational design work and allows the user to "jump-start" the design process. In many cases, the assisted design created using the design starter module 99 may be ready to render. However, the information provided in the instruction section 152 will make it clear that the user will also have the opportunity to customize each and every element of the assisted design using a design modification module 348 if they so desire. When the user is prepared to move forward with their design, the user may click, touch, or otherwise select the get started button 154 which is programmed to cause the application 27 to display the input screen 200.

As illustrated in FIG. 6, the input screen 200 of the application 27 may be provided with a primary text section 202 configured to receive input from a user, a secondary text section 204 configured to receive input from a user, a confirmation button 206, and a back button 208. In operation of the application 27, the user may tap or otherwise select the primary text section 202 to enter a title or other identifying information they wish to be a part of their design. Once the user clicks, taps, or otherwise selects the primary text section 202, the application 27 may be programmed to cause the user device 14 to display a touch activated keyboard (not shown) or other data entry method supported by the user device 14 to allow the user to enter the desired text in the primary text section 202.

In a typical workflow, once the user has input the desired text characters in the primary text section 202, the user may tap or otherwise select the secondary text section 204 to input any additional text characters. The text characters input in the primary text section 202 may together comprise the primary information that the user wants to convey to viewers of the ultimate design. The primary information may be, for instance, a team name (e.g. "The Fairfax Fielders"), an event (e.g. "Fairfax Fun Fair"), or a business name (e.g. "Fairfax Furs"). The text characters input in the secondary text section 204 may together comprise any second information that the user wants to convey to viewers of the ultimate design. The secondary text may be, for instance, a tagline, a slogan, or a date or dates. Once the user selects the primary text section 202 or secondary text section 204, the application 27 may be programmed to cause the user device 14 to display a touch activated keyboard (not shown) or other data entry method supported by the user device 14 to allow the user to input the desired text in the primary text section 202 and/or the secondary text section 204. Although the preceding describes a typical workflow using the application 27, it should be noted that the application 27 may be programmed not to require input of text on the input screen 200 in a particular order. For instance, the user may choose to input text in secondary text section 204 before inputting text in the primary text section 202.

By way of illustration, and for the sake of explaining the design and function of the application 27 herein, FIG. 6 shows the text "One Two Three" entered in the primary text section 202 and "Tree Service" input in the secondary text section 204. In this example, "One Two Three Tree Service" is the name of an imaginary company. In this example, since there may be other tree cutting service business, this example assumes that the user may desire to highlight the unique portion of its name (i.e. "One Two Three") over the fact that it is a "tree service." It should be noted, that before the user selects the primary text section 202 or the secondary text section 204, the application 27 may be programmed to display instructions for the user such as, for instance, "tap here to enter main text" in the primary text section 202 and/or "tap here to enter a tagline, slogan, date, etc." in the secondary text section 204 to indicate to the user what information may be input into each section.

While the application 27 is provided with the primary text section 202 and the secondary text section 204, the application 27 may be programmed to only require the user to input text in only one of the primary text section 202 or the secondary text section 204. It is also contemplated that application 27 may ignore any distinction between the primary and secondary text inputs by concatenating the two input fields into a single string of text characters with either a space or a carriage return between the text characters associated with the separate text sections. As would be understood by those of ordinary skill in the art after reviewing the present specification, drawings, and claims, by concatenating the two text fields into one single string of characters the number of design options that may be provided to the user is anticipated to be more numerous than the number of layouts that could be generated while maintaining the distinction between the primary and second texts. It is contemplated that one embodiment of the application 27 could give the user the option of combining the primary and secondary texts while explaining the anticipated advantages and disadvantages that accompany both choices when using the assisted design module 99.

In one embodiment of the system 10, when the user selects the confirmation button 206 on the input screen 200, the application 27 is programmed to send a signal via the network 16 to the host system 12 where, in response to receiving the signal, the program logic 34 generates instructions necessary to cause the application 27 to display the layout screen 250 and causes the host system 12 to send the instructions as a signal via the network 16 to the user device 14 where the application 27 parses the instructions and displays the layout screen 250. In the embodiment shown in FIG. 7, the layout screen 250 is provided with a layout 251, a first text section 252, a second text section 254, a design element section 256, a model 258 of the T-shirt design, a design themes button 260, a refresh design button 262, an edit text button 264, a confirmation button 266, and a settings button 268. While FIG. 7 uses model 258 of a T-shirt design to illustrate the layout screen 250, as would be understood by those of ordinary skill in the art after reviewing the present specification, drawings, and claims, other substrates may be used as the template for the layout, such as long-sleeve shirts, shorts, sweatshirts, sweatpants, bandanas, water bottles, and coffee mugs. Further, the layout screen 250 may be provided having a solid background color over which the layout 251 is displayed for review by the user and no model is provided. As would be also understood by those of ordinary skill in the art after reviewing the present specification, drawings, and claims, other substrates have different printable areas associated with each substrate which would require different layouts and the system 10 may be programmed to review and display only layouts which will work with a selected substrate on the layout screen 250.

The layout screen 250 is designed to assist the user in their design by visually displaying the input text on the model 258 as part of an automatically selected layout 351 having a specific arrangement of text and imagery determined in part by an automatic selection of a theme. Automatic selection of the possible layouts will be described in more detail in reference to FIG. 12 herein.

Figure 8:
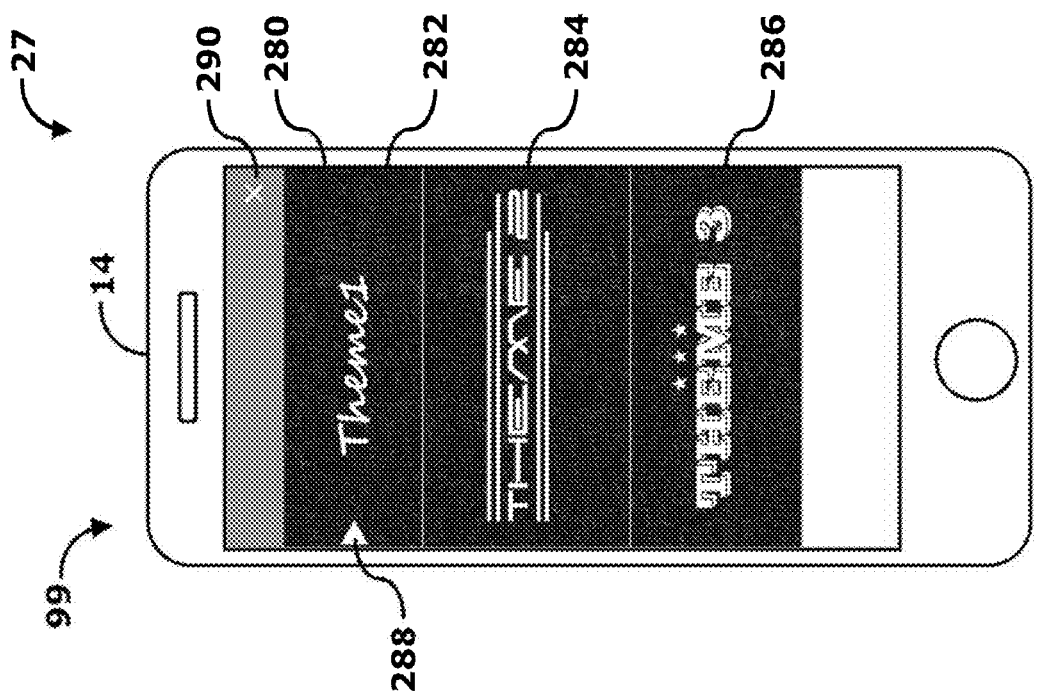
FIG. 8 is an illustration of an exemplary theme selection screen in accordance with some embodiments of the present disclosure.
Figure 11:
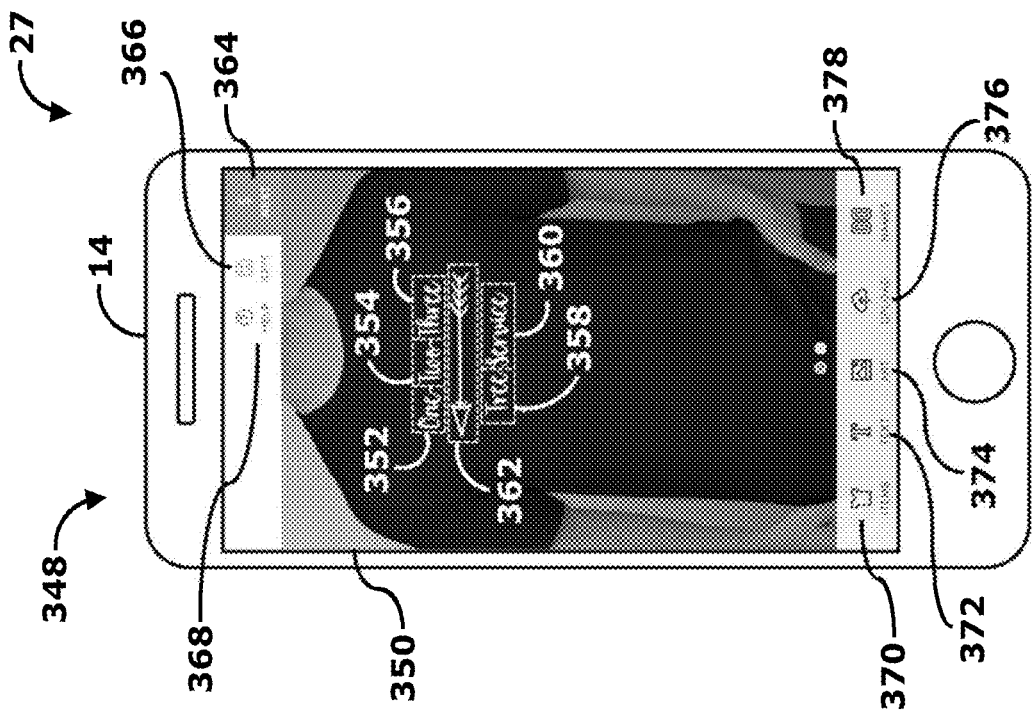
FIG. 11 is an illustration of an exemplary customization screen in accordance with some embodiments of the present disclosure.

In the exemplary embodiment shown in FIG. 7, layout 251, which is one available layout of "Theme 1," has been generated for display on the layout screen 250. It should be noted that Theme 1 may have other layouts available which will work with the text string input by the user and those will be generated for review by the user as will be described herein. In addition, there may be other themes which have available layouts that will work with the text string input by the user. As shown in FIG. 8, the application 27 will provide a list of themes for each theme that has at least one possible layout that could be generated based on the text string the user input into the primary text section 202 and/or the secondary text section 204 of the input screen 200. The user may review the layouts for each theme as will be discussed herein.

In one embodiment, the application 27 may be programmed to display the possible layouts in order. For instance, the host system 12 may store available themes and available layouts associated with each theme organized in the database 32 and when the program logic 34 of the host system 12 generates a series of possible layouts, a first set of layouts to be sent to the application 27 may be the possible layouts associated with the first theme stored in the database 32. Further, the program logic 34 may generate and send any further sets of layouts in the order of the themes as they are stored in the database 32. In another embodiment, the program logic 34 may be programmed to recognize, for instance, individual words, word groupings, or phrases in the text input by the user, such as the word "Birthday," and automatically select a particular theme and/or layout having a particular design element and/or graphical element (e.g. a cupcake-oriented layout or theme or a layout or theme having a cupcake graphical element) based on a predetermined set of layouts associated with such recognized text or themes previously selected by other users who input similar text and generate and return the automatically selected layout first. In another embodiment, the program logic 34 may be programmed to recognize, for instance, individual words, word groupings, or phrases in the text input by the user, and automatically substitute or change a design element and/or graphical element of a particular theme and/or layout based the recognized text and a full text and/or a meta tag based search of available design elements. For example, if the exemplary text input by the user referred to above included both the words "Birthday" and "Unicorn", the program logic 34 may be programmed to find and return the cupcake-oriented layout or theme associated with the word "Birthday" but search the available graphical elements for a graphical element having a meta tag identifying the graphical element as a representation of a unicorn and replace the cupcake graphical element with the graphical element representative of a unicorn. Further, where there are multiple graphical elements that are returned as part of a search, the host system 12 may be programmed to insert the graphical element that has been identified in the host system 12 as the most popular, i.e., the graphical element that the most users have selected given a choice.

As illustrated in FIG. 7, based on the particular layout shown, the first text section 252 of the exemplary layout 251 is able to hold and thus contains the example text input by the user in the primary text section 202 of the input screen 200 and the second text section 254 of the exemplary layout 251 is able to hold and thus contains the text input by the user in the secondary text section 204 of the input screen 200. A font face of the text in the first text section 252 and the second text section 254 in each particular layout are based on the design aesthetic associated with each particular theme. In the illustrated theme, the font face for both the first text section 252 and the second text section 254 are the same. It should be noted, however, that in some themes and/or layouts, the text in the first text section 252 and the text in the second text section 254 may have different font faces. Further, in some themes and/or layouts, the font size may be different for the first text section 252 as compared to the second text section 254.

Although the exemplary layout 251 is shown having a first text section 252 and a second text section 254, it should be noted that the program logic 34 may be programmed to determine the optimal number of text sections based on factors such as the number of characters in each word, white space breaks between words, and new lines specified by the user in the text string input by the user on the input screen 200. For instance, if the first text section 252 of a particular layout were provided with a maximum width equal to ten (10) characters, the program logic 34 would determine that the primary text "One Two Three" would have to be broken up at the white space between the "Two" and the "Three" to fit the first portion of the input text string (i.e. "One Two") within the maximum character limit of the first text section 252. The program logic 34 would then try to fit the remaining characters of the input text string (i.e. "Three" and "Tree Service") in other available text sections in the particular layout. In the illustrated approach, the text string "Three" was input as primary text and text string "Tree Service" was input as secondary text so the program logic 34 will not place them both in the same text section. Therefore, in this illustrated approach the program logic 34 would require a layout having at least three text sections for the layout to work with this example text input. Because layout 251 only has two text sections 252 and 254, the program logic 34 would not return layout 251 as a possible layout in this example. Instead, the program logic 34 would have returned a layout such as layout 450 shown in FIG. 14 which has three text sections available.

In one embodiment of the application 27, each layout may have a design element associated with the layout that is displayed in the design element section 256 of the layout screen 250. In such an embodiment, a size, orientation, color, shape, graphic decoration, and placement of the design element may be predetermined based on the theme, number of characters/words that can be placed into each text section (e.g. first text section 252 and second text section 254), and/or a size of the printing area (e.g. the printable portion of model t-shirt 258) the design is to be printed on. In another embodiment, the program logic 34 may be programmed to automatically select the design element based on the text input by the user. For instance, the program logic 34 may be programmed to search the text input by the user to identify certain key words, word groups, or phrases and automatically select a design element associated with such text. By way of non-limiting example, if the user input the text "tri-city baseball tournament" into the primary text section 202 of the input page 200, the program logic 34 may automatically select a layout having a baseball graphical element and generate that layout to be sent to the application 27 to be displayed first on the layout screen 250, for instance.

It should be noted that the arrangement of text sections such as the first text section 252 and the second text section 254 may be different for different layouts or based on the shape and/or size of the design element section 256. For example, if the design element section 256 contained a graphical representation of a round object, the first text section 252 and/or the second text section 254 may be arranged axially aligned with an outer circumference of the round object.

The refresh design button 262 is programmed to cause the application 27 to change the layout displayed on the layout screen 250 on the user device 14. For instance, in one example selecting the refresh design button 262 may change the displayed layout 251 to show layout 450 (FIG. 14) which is another layout variation of Theme 1. Selecting the refresh design button 262 again would change the displayed layout 450 to a different layout under Theme 1 that the program logic 34 determined would work with the text string input by the user. The application 27 may be programmed to continue to cycle in this manner through each layout in Theme 1 that the program logic 34 has determined will work with the text string input by the user. Changing the layout is designed to allow the user to see different variations of the current theme to help them determine a desired design. It should be noted that the examples have been provided by way of illustration only and should not be considered as limiting.

If the user wants to change the text displayed in the first text section 252 or the second text section 254, the user may select the edit text button 264. The edit text button 264 may be programmed to cause the application 27 to display the input screen 200 where the user may select the primary text section 202 and/or the secondary text section 204 to change the text input therein.

The user can view different themes by selecting the design themes button 260. The design themes button 260 is programmed to cause the application 27 to display the theme selection screen 280. One embodiment of the theme selection screen 280 is shown in FIG. 8. In the embodiment illustrated in FIG. 8, the theme selection screen 280 is provided with a first theme section 282, a second theme section 284, a third theme section 286, a current theme indicator 288, and a close button 290.

As illustrated in FIG. 8, the current theme, Theme 1, is indicated by the current theme indicator 288. A preview of different themes are displayed in the second theme section 284 and the third theme section 286. This preview allows the user to see exemplary fonts and/or design elements that sufficiently exemplify the aesthetic of the theme to allow a common user to intuit the type of layouts that would be found within the theme. The user may select a different theme by clicking or otherwise selecting the second theme section 284 or the third theme section 286. It is contemplated that application 27 could have dozens of themes with each theme potentially having dozens of possible layouts that could be returned based on the text input by the user. One potential theme could be sports motifs. Another theme could have a beach scene vibe. Yet another theme could present classic lines, fonts, and design elements.

In the exemplary embodiment shown in FIG. 8, the theme selection screen 280 only displays the themes that the program logic 34 automatically selected based on the text input by the user. In this case, the program logic 34 has determined that theme 1, theme 2, and theme 3 have layouts that are renderable based on the text string input by the user. In a case where there are more themes automatically selected by the program logic 34 and sent to the application 27 than can be displayed on the theme selection screen 280, the application 27 may be programmed to allow the user to scroll through a list of the themes on the theme selection screen 280 using methods well known in the art.

Figure 16:
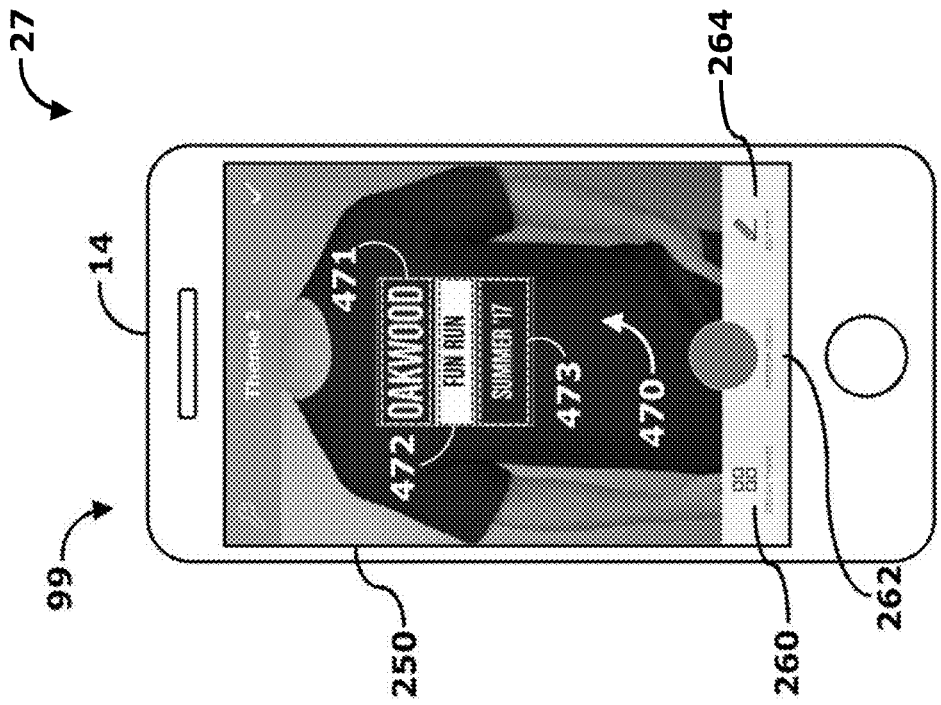
FIG. 16 is an illustration of an exemplary layout screen displaying another exemplary layout of user input text in accordance with some embodiments of the present disclosure.
Figure 15:
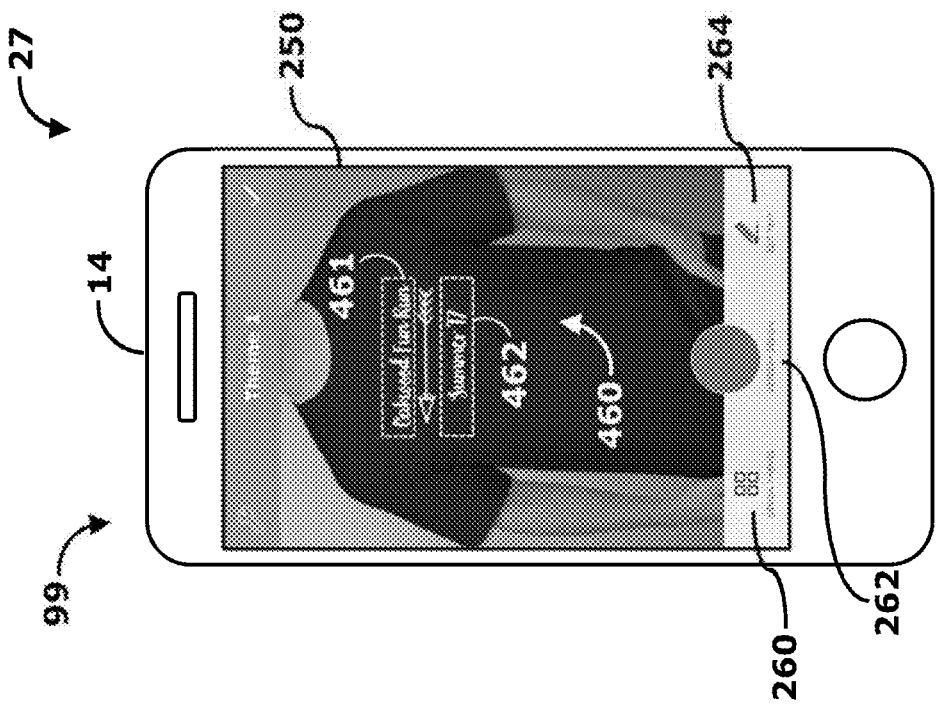
FIG. 15 is an illustration of an exemplary layout screen displaying another exemplary layout of user input text in accordance with some embodiments of the present disclosure.
Figure 17:
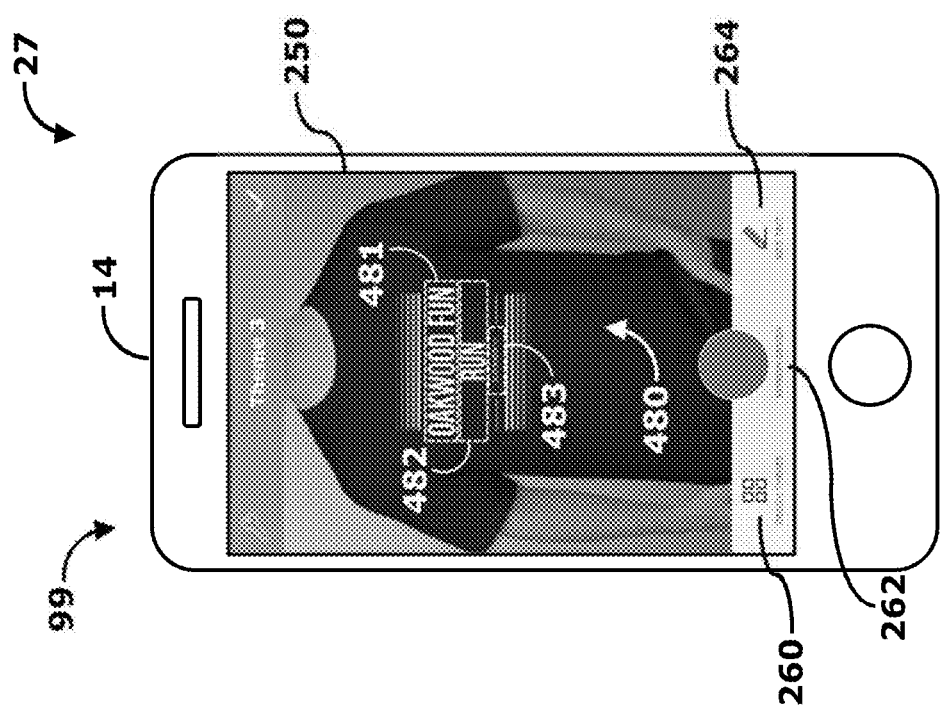
FIG. 17 is an illustration of an exemplary layout screen displaying another exemplary layout of user input text in accordance with some embodiments of the present disclosure.

If the user selects a new theme from the theme selection screen 280, the application 27 is programmed to send a signal via the network 16 to the host system 12 where, in response to receiving the signal, the program logic 34 generates instructions necessary to cause the application 27 to display a set of possible layouts associated with the new theme on the layout screen 250 and causes the host system 12 to send the instructions as a signal via the network 16 to the user device 14 where the application 27 parses the instructions and displays a first layout of the new theme on layout screen 250. For instance, FIGS. 15-17 show an exemplary illustration of changing themes where the user has input the text string "Oakwood Fun Run" in the primary text section 202 and "Summer '17" in the secondary text section 204 of the input screen 200. In FIG. 15, the exemplary text string input by the user is shown in a layout 460 of Theme 1. If the user were to select "Theme 2" by selecting the second theme section 284 on the theme selection screen 280, for instance, the application 27 is programmed to display a layout 470 of Theme 2 on the layout screen 250. Likewise, If the user were to select "Theme 3" by selecting the third theme section 284 on the theme selection screen 280, the application 27 would display layout 480 of Theme 3 on the layout screen 250.

When the user is done with the design, the user may select the confirmation button 266 on the layout screen 250. The confirmation button 266 may be programmed to cause the application 27 to send a signal via the network 16 to the host system 12 where, in response to receiving the signal, the program logic 34 generates instructions necessary to cause the application 27 to display the customize screen 300 for existing users or the save your design screen 320 for users who have not registered and causes the host system 12 to send the instructions as a signal via the network 16 to the user device 14 where the application 27 parses the instructions and displays the customize screen 300 for existing users or the save your design screen 320 for users who have not registered.

Although not shown, it should be noted that some embodiments of the application 27 may be programmed with means for verifying a user, such as a login screen, where the user may enter a username and password combination, for instance, to gain access to the application 27. Such methods are well known in the art. Thus, the various methods of verifying a user before allowing them to access the application will not be discussed herein.

It should be noted that the application 27 may be programmed to automatically save the assisted design when the user selects the confirmation button 266 on the layout screen 250 and/or periodically or systematically throughout the assisted design process. The application 27 may be programmed to automatically save the assisted design in the memory 26 on the user device 14 and/or the application 27 may be programmed to automatically send the assisted design over the network 16 to the host system 12 to be stored in the database 32 as a file associated with the user.

In some embodiments of the system 10, the application 27 may be programmed to differentiate designs created using assisted design module 99 from designs that have been created using a design modification module 348. For instance, when a design created using the assisted design module 99 is saved, the application 27 may be programmed to append or prepend the name of a file containing the assisted design with a predetermined identifier such as AD before saving the assisted design. It should be noted that other methods of differentiating assisted designs may be used so long as the system 10 and/or the user are able to differentiate designs created using the assisted design module 99 from designs created using the design modification module 348.

Figure 9:
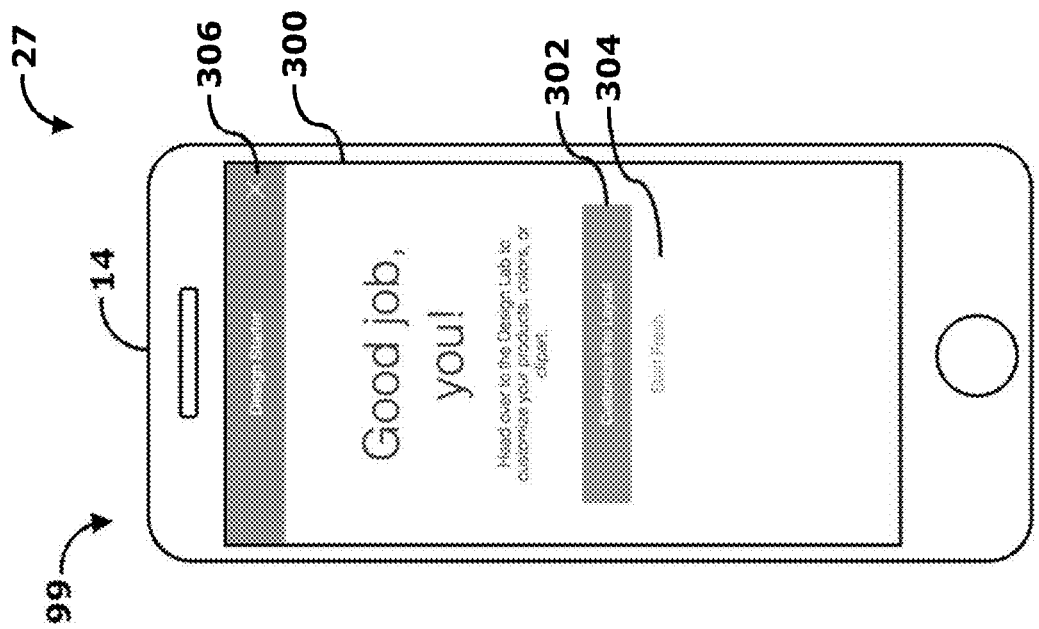
FIG. 9 is an illustration of an exemplary customize screen in accordance with some embodiments of the present disclosure.

As shown in FIG. 9, the customize screen 300 is provided with a customize button 302, a start fresh button 304, and a close button 306.

In one embodiment, the start fresh button 304 may be programmed to cause the application 27 to display the welcome screen 100 where the user may choose to start a new design using the design starter or to start a new design from scratch. In another embodiment, the start fresh button 304 may be programmed to cause the application 27 to automatically take the user to the input screen 200 to start a new assisted design.

Figure 10:
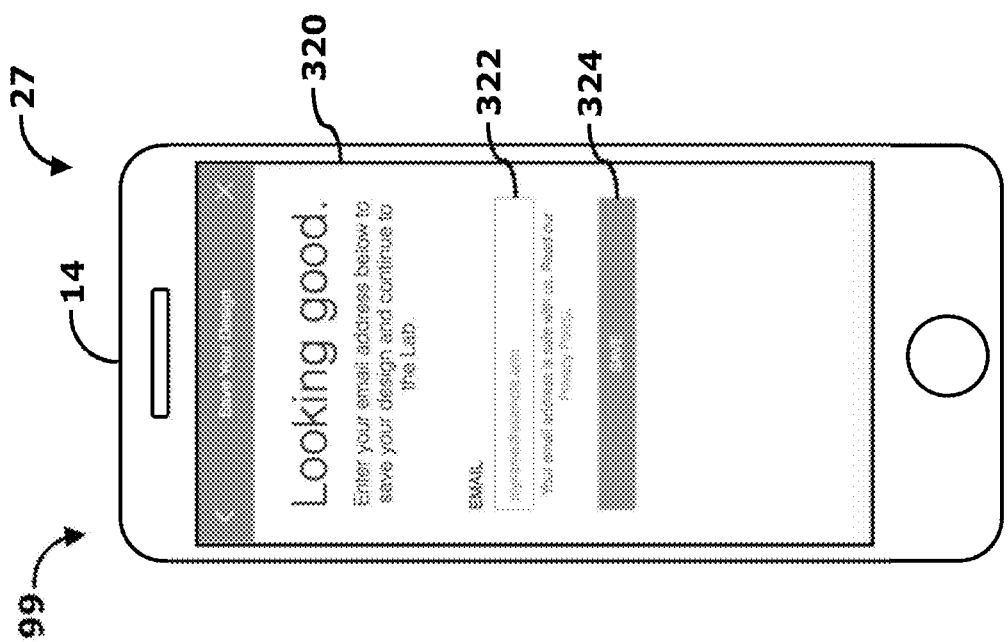
FIG. 10 is an illustration of an exemplary save your design screen in accordance with some embodiments of the present disclosure.

As shown in FIG. 10, the save your design screen 320 may be provided with an input section 322 and a save button 324. In the embodiment shown in FIG. 10, the input section 322 is designed to accept input from the user such as an email address. After inputting the email address in the input section 322, the user may select the save button 324 which is programmed to cause the application 27 to send the email address over the network 16 to the host system 12 where the email address may be saved as a username or unique identifier in the database 32 associated with the user device 14 and/or the assisted design created by the user. In one embodiment, the host system 12 may send an email to the email address provided with a link to the saved design. This link may be configured to launch the design modification module 348 with the saved design loaded. This email may be particularly useful where the user had been using the assisted design process on a user device 14 with a small form-factor. In this approach, a user may open the email, and click on the link from another user device 14 with a larger form-factor (e.g. a personal computer) to provide a more conducive user experience for more complex design modifications via the design modification module 348.

To customize any part of the assisted design, the user may click or otherwise select the customize button 302 of the customize screen 300 or the save button 324 of the save your design screen 320. The customize button 302 and the save button 324 are programmed to cause the program logic 34 to prepare and export the assisted design for customization in the design modification module 348 and display it on the design customization screen 350 of the application 27.

The application 27 is programmed to allow customization of each element of the assisted design separately using the design modification module 348. This is accomplished by separating the text strings input in the first text section 252 and the second text section 254 and any graphical elements in the design element section 256 into individual elements represented as a first element 352, a second element 354, a third element 356, a fourth element 358, a fifth element 360, and a sixth element 362 on the customization screen 350. In one embodiment of the system 10, the separation of the individual elements 352-360 takes place as the program logic 34 evaluates each layout stored in the databases 32 of the host system 12 of the system 10 to generate and return possible layouts representing a design configuration for the input text string which will be described in further detail herein. In short, in such an embodiment the program logic 34 evaluates the text string input by the user for breakpoints (i.e., spaces and new lines), and creates each individual element 352-360 based on those breakpoints. By way of illustration, the text string "One Two Three" would be separated at each space to create individual elements 352 ("One"), 354 ("Two"), and 356 ("Three"), respectively. It should be noted, however, that in such an embodiment, the separation of the individual elements 352-360 representing words in the text string input by the user is transparent to the user until the assisted design is opened in the design modification module 348. In other words, as far as the user is concerned, in the design starter module 99 the individual elements 352, 354, and 356 are not separate but are all part of the first text section 252 and individual elements 358 and 360 are part of the second text section 254 of the layout screen 250. When the assisted design is opened in the design modification module 348, however, the individual elements 352-360 become apparent and are editable by the user. The same is true of the design elements as well. The "arrow" illustrated in the design element section 256 is not the best example because it is only one element, however, it should be understood that in such an embodiment when the program logic 34 generates a layout having a plurality of design elements, each design element is generated as an individual element (such as the sixth element 362) which are grouped together in the design starter module 99 but become individually editable in the design modification module 348. For example, in layout 480 in FIG. 17, the bars at the top, the bars at the bottom, as well as the bar to the left and the bar to the right of text section 483 in layout 480 would each be generated by the host system 12 as individual elements, however, to the user they are one design element in the design starter module 99. It is only when layout 480 is opened in the design modification module 348 that it becomes apparent that they are individual elements and the design modification module 348 allows the user to edit them as desired. It should be noted that individual elements comprised of text or characters input by the user may also be referred to as text elements and individual elements comprised of design elements may be generically referred to as graphical elements herein. In another embodiment of the system 10, the separation of the individual elements 352-362 takes place as the program logic 34 prepares the assisted design for export into the display modification module 348. In another embodiment of the system 10, the individual elements are separated after they have been imported into the design modification module 348. In any case, it will be appreciated by a person of skill in the art having the benefit of this disclosure that the application 27 is programmed to allow the user to edit each of the individual elements 352-362 separately.

Customization of the individual elements 352-362 may include, but is not limited to, changing the font, font size, size, shape, orientation, arrangement, location and/or color of one or more of the individual elements 352-362. In other words, the individual elements 352-362 are fully customizable using tools available in the design modification module 348. For instance, the user may edit the previously input or add text using a text tool by selecting a text button 372 on the customization screen 350. In fact, the user would be able via the customization screen 350 to change the size of the text boxes that were previously size-constrained within the application 27. The user may also change the color and/or style of the text. The user may further change the color and/or style of a substrate on which the design will be rendered which, in this case, is a T-shirt as illustrated on the customization screen 350, using an items tool by selecting an items button 370 on the customization screen 350 of the application 27.

The user may also edit and/or change the graphical element represented by the arrow in the sixth element 362. For instance, the user may change the size, shape, orientation, and/or color of the graphical element using an art tool by selecting an art button 374. If the user has a picture that is associated with a logo of the One Two Three Tree Company, for instance, the user may replace the arrow in the sixth element 362 with the picture by uploading the picture using an upload tool by selecting the upload button 362. The user may then edit the picture using the design modification module 348 tools.

It should be noted that in addition to making the individual elements 352-362 editable, the user may also use the design modification module 350 to add additional elements (even new ones) to the design, if so desired.

The user may select a save button 366 at any time during the design process to save their work. If the user needs assistance or needs to know how a tool works, for instance, the user may access help files by selecting a help button 368.

When the user is finished customizing their design, the user may select a next button 364 which is programmed to cause the application 27 to display pricing and purchasing details as is known in the art.

Figure 12:
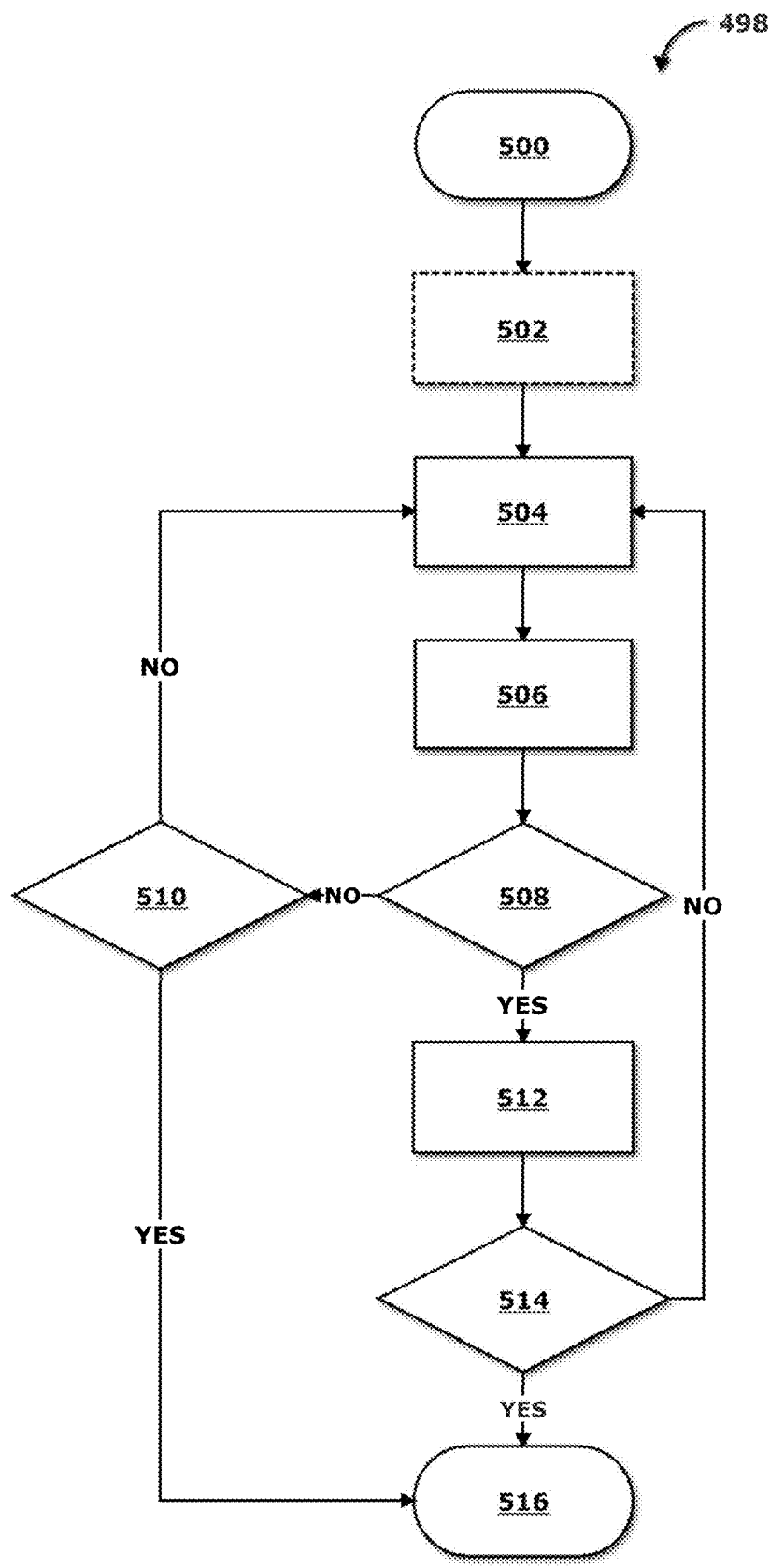
FIG. 12 is a flow diagram illustrating operation of an exemplary method of automatically determining layouts that will work for a given input string in accordance with some embodiments of the present disclosure.

FIG. 12 illustrates a flow diagram of an exemplary process 498 for automatically determining layouts that will work for a given input string. In step 500, the user inputs text, for instance, in the primary text section 202 and/or the secondary text section 204 of the input screen 200 (see FIG. 6).

After the user confirms their input on the input screen 200, in step 502 the application 27 sends the input text via the network 16 to the host system 12 where the program logic 34 may concatenate the text string input in the primary text section 202 and/or the secondary text section 204 of the input screen 200 into a combined text string, separated by a new line. For example, if the user input the text string "One Two Three" in the primary text section 202 and the text string "Tree Service" in the secondary text section 204 of the input screen 200, if the system 10 were using the programming language JavaScript, for instance, at step 502 the program logic 34 would concatenate the input text strings as "One Two Three\nTree Service". It should be noted that other programming languages may be used, and this example has been provided for the purposes of illustration only.

In step 504, starting with the first layout, the host system 12 evaluates each layout stored in the databases 32 of the host system 12 of the system 10 to generate and return possible layouts representing a design configuration for the text string. Where the input text strings were combined in step 502, the host system 12 evaluates each layout stored in the databases 32 to generate and return possible layouts representing a design configuration for the combined text string.

It should be noted that in one embodiment of the system 10, the program logic 34 may be programmed to loop through the words/groupings of contingent characters delimited by whitespace and/or any new lines input by the user in the input text string before performing step 504 to determine a size of the text string input by the user. For example, in one embodiment the program logic 34 may return a total number of characters as the size. In another embodiment, the program logic 34 may return a total number of words/groupings of contingent characters as the size. In another embodiment, the program logic 34 may return a total number of words/groupings of contingent characters and a number of characters in each word/grouping of contingent characters as the size. In any case, the program logic 34 may then compare the size of the text string input by the user with the size designation of each breakpoint to identify layouts having a size designation that could not contain the text string input by the user and the program logic 34 may be programmed to exclude the identified layouts from those evaluated in step 504. In this way, the program logic 34 does not have to evaluate each layout stored in the database 32 for every text string input by the user.

In step 506, the program logic 34 of the host system 12 determines whether a given layout can accommodate an optimal variation of the input text string. This optimal variation of the input text string is determined by looping through all text section breakpoints in the layout, starting with the smallest, then recursively looping through the words/groupings of contingent characters delimited by whitespace and/or any new lines input by the user in the input text string and attempting to fit those words/groupings of contingent characters into the text sections of the layout. Where the input text strings were combined in step 502, this process is simpler and will likely lead to more available design options. Where the input text string is maintained as primary and secondary text, the layouts may also provide primary and secondary text sections, which may further be designed to display the primary and secondary text differently (e.g. differing font sizes and/or types) and would likely provide lesser prominence within the layout for the secondary text section than the primary text section.

It should be noted that the words/groupings of contingent characters referred to herein both refer to groups of characters which the host system 12 identifies as belonging together based on the whitespace and/or new line that separate one group of characters from another. For example, if the user were to input the exemplary text "Oakwood Fun Run\nSummer '17", the host system 12 would identify each of the words "Oakwood," "Fun," "Run," and "Summer" as being a group of characters belonging together because they are words, and there is a space (whitespace) that separates "Oakwood" and "Fun", a space that separates "Fun" and "Run", and a new line that separates "Run" and "Summer". Further, the host system would identify "'17" as a group of characters because "'17" is a grouping of contingent characters and there is a space that separates "Summer" and "'17".

For the sake of clarity, it should be noted that the exemplary program logic 34 (as a matter of design choice) does not consider a hyphen in the input text to be whitespace. In other words, if the user were to input the exemplary text "One Two Three" as "One-Two-Three", the program logic 34 would not consider separating the text between the "One" and the "Two" or the "Two" and the "Three" when determining the optimal variation of the input text. An exemplary layout 400 of this input text produced by exemplary program logic 34 is shown in FIG. 13.

In the exemplary embodiment described, the program logic 34 is programmed to separate text as designated by a new line input by the user. For instance, if the user were to input the exemplary text "One Two Three" as "One Two\nThree" ("\n" representing a new line as input by the user), the program logic 34 would require that the text string "Three" be in a separate text section from the string "One Two" when determining potential variations of the input text. In other words, if the example text also included "Tree Service" input in the secondary text section 204 of the input screen 200, the program logic 34 would only return layouts having at least three text section breakpoints. An exemplary layout 450 illustrating this input text is shown in FIG. 14.

In the decision step 508, the program logic 34 determines, for each layout, if the given layout has enough text section breakpoints to accommodate the entire input text string. If the current layout is not a match, the program logic 34 moves to decision step 510 and determines if all of the layouts in the system 10 have been evaluated.

If the current layout is a match, in step 512 the program logic 34 adds the layout to a list of layouts that will be generated and returned for display in the layout screen 250 on the user device 14.

In decision step 514, the program logic 34 determines if all of the layouts have been evaluated. If all the layouts have not been evaluated, the program logic 34 returns to step 504 and begins evaluating the next layout.

If all of the layouts have been evaluated, in step 516 each of the layouts on the list of matching layouts is generated and returned for display in the layout screen 250 on the user device 14.

Referring now to FIGS. 15-17, shown therein are examples illustrating possible layouts returned by the program logic 34 for a given text string input by the user. In this exemplary illustration, the user input the text string "Oakwood Fun Run" in the primary text section 202 and the text string "Summer '17" in the secondary text section 204 of the input screen 200.

In layout 460 illustrated in FIG. 15, an exemplary first text section 461 is provided having a maximum width equal to sixteen (16) characters and an exemplary second text section 462 is provided having a maximum width equal to sixteen (16) characters. In this case, the text string input in the primary text section 202 is equal to fifteen (15) characters (thirteen (13) letters and two (2) spaces) and the text string input in the secondary text section 204 is equal to eleven (11) characters (six (6) letters, one (1) space, one (1) symbol, and two (2) numbers), therefore, the text strings input by the user in the primary text section 202 and the secondary text section 204 fit within first text section 461 and the second text section 462, respectively, and the program logic 34 does not have to separate the primary text string or the secondary text string input by the user. Because layout 460 can accommodate the given text string, layout 460 is generated as illustrated in FIG. 15 using the given text string and returned for display on the layout screen 250 as a possible layout.

In layout 470 illustrated in FIG. 16, on the other hand, an exemplary first text section 471 is provided having a maximum width equal to eight (8) characters, an exemplary second text section 472 is provided having a maximum width equal to twelve (12) characters, and an exemplary third text section 473 is provided having a maximum width equal to sixteen (16) characters. To determine if layout 470 will work with the text string input by the user, the program logic 34 recursively loops through the words/groupings of contingent characters of the text string input by the user, delimited by whitespace and new lines in the input text string, and attempts to fit those words/groupings into the text sections available in the layout 470. It should be noted that the first, second, and third text sections 471, 472, and 473 each have an order number associated with each (1, 2, and 3, respectively). The order number of the text sections does not necessarily reflect the top to bottom ordering of the text sections in the layout. Rather, the order number of the text sections is used to place the input text into a particular layout with known order. In designing the layouts for subsequent use in the assisted design process, the artist would place the text sections in accord with this understanding. So, if the artist felt that the first word in the user input text string would make design sense placed in the middle of a geometric design element (e.g. rectangle, circle, triangle), which may be placed at the center of the layout, then the first portion of the user input text string—up until the breakpoint that results in fewer characters than the size of the first text section would be loaded into the first text section deployed in the middle the geometric design element in the middle of the layout.

In one embodiment, the program logic 34 works recursively in reverse order through the text string input by the user and the order of the text sections 471, 472, and 473 when determining what text to input into each given text section 471, 472, and 473. In other words, the program logic 34 would try to place the text string input by the user in the secondary text section 204 into the third text section 473 first, then, if that entire text string fits (as it does in this illustrative example), the program logic 34 would begin at the end of the text string input in the first text section 202 and determine if the second text section 472 would accommodate the entire text string. In this illustrative example, the program logic 34 would determine that the entire primary text string (i.e. "Oakwood Fun Run") would not fit in the second text section 472. Therefore, the program logic 34 would determine (for this illustrative example) the breakpoint closest to the number of characters that would fit in the second text section 472 (in this case the space (whitespace) between "Oakwood" and "Fun"), and input the text string "Fun Run" in the second text section 472. The program logic 34 would then determine that "Oakwood" (seven (7) characters) would fit in the first text section 471 which in this particular layout can accommodate eight (8) characters (as noted above). Therefore, the program logic 34 would return the illustrative layout 470 as a possible layout for the text string input by the user and generate the layout 470 for display on the layout screen 250 of the application 27.

As described above, in some embodiments of the program logic 34, the text strings input by the user in the primary text section 202 and the secondary text section 204 of the input screen 200 may be concatenated, separated by a new line, to form a combined text string. The program logic 34 then reviews the combined text string to generate and return layouts that will work with the combined text string. For the sake of illustration, the process of generating layout 480 will be described below using such an embodiment.

In layout 480 illustrated in FIG. 17, an exemplary first text section 481 is provided having a maximum width equal to twelve (12) characters and an order number 1, an exemplary second text section 482 is provided having a maximum width equal to twelve (12) characters and an order number 2, and an exemplary third text section 483 is provided having a maximum width equal to sixteen (16) characters and an order number 3. In this embodiment, to determine if layout 480 will work with the combined text string, the program logic 34 recursively loops through the words/groupings of the combined text string (as concatenated from the text strings input by the user) from beginning to end. In other words, in this case the program logic 34 started from the beginning of the combined text string and determined that the first twelve characters were "Oakwood Fun" ending with the space after "Fun." Therefore, the program logic 34 separated the combined text string at the space between "Fun" and "Run" and placed "Oakwood Fun" in the first text section 481 of layout 480. The program logic 34 then continued through the combined text string and determined that the new line after "Run" meant that only the three (3) characters of "Run" would need to fit in the second text section 482. Because the second text section 482 could accommodate twelve (12) characters, the program logic 34 placed "Run" in the second text section 482. The program logic 34 then determined that the remaining characters "Summer '17" would fit in the third text section 483. Therefore, the layout 480 having "Oakwood Fun" inserted in the first text section 481, "Run" in the second text section 482, and "Summer '17" in the third text section 483 was returned as a possible layout for the assisted design the user was creating and generated for display in the layout screen 250.

It should be noted that the program logic 34 may be programmed to review an input text string using any method discussed above, in other words, the program logic 34 may review the combined text string from beginning to end or from the end to the beginning.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system for creating a renderable design, comprising:
   a host system comprising:
      a processor, a network interface for bi-directional communication between the host system and a user device, and at least one non-transitory computer readable memory storing a database and program logic that when executed causes the processor to generate instructions for an application displayable in a browser on the user device;
   wherein the program logic causes the host system to send a first signal containing instructions for displaying an input screen of the application in the browser of the user device via the network interface, the input screen having at least one section configured to receive input from a user;
   in response to receiving a second signal containing a text string from the user device, the program logic is programmed to cause the host system to evaluate each layout stored in the database to generate and return at least one layout representing a possible design configuration for the text string by determining at least one breakpoint in the text string, each of the at least one breakpoint being whitespace between text characters or a new line, then determining text sections in the at least one layout that can accommodate an optimal variation of the text string, the optimal variation of the text string determined by looping through all text sections in the at least one layout, starting with a smallest, then recursively looping through groups of characters delimited by the at least one breakpoint in the text string, and attempting to fit those groups of characters into text sections of the at least one layout;
   in response to generating the at least one layout, the program logic causes the host system to send a third signal via the network interface to the user device, the third signal containing instructions for causing the user device to display the at least one generated layout on a layout screen; and
   responsive to receiving a fourth signal containing confirmation of a selection of the at least one generated layout displayed on the layout screen, the program logic is programmed to cause the host system to generate a renderable design of the selected at least one generated layout displayed on the layout screen.

2. The system of claim 1, wherein the host system recursively loops through the groups of characters delimited by the at least one breakpoint in the text string starting from an end of the text string working forward to a beginning of the text string when attempting to fit those groups of characters into text sections of the at least one layout.

3. The system of claim 1, wherein the host system recursively loops through the groups of characters delimited by the at least one breakpoint in the text string starting from a beginning of the text string working backward to an end of the text string when attempting to fit those groups of characters into text sections of the at least one layout.

4. The system of claim 1, wherein the host system separates the text string into individual elements formed by groups of characters, the text string separated at the at least one breakpoint, then recursively loops through the individual elements attempting to fit those individual elements, individually or in groups, into text sections of the at least one layout.

5. The system of claim 4, wherein the at least one layout generated includes at least one graphical element, each at least one graphical element being an individual element.

6. The system of claim 5, wherein the renderable design is an assisted design and the program logic causes the host system to send a fifth signal via the network interface to the user device, the fifth signal containing instructions for causing the application to open the assisted design in a design modification module displayed in a customization screen on the user device, the design modification module allowing the user to modify each individual element of the assisted design separately.

7. A method for creating a renderable design, comprising:
   establishing communication between at least one host system and a user device, wherein the at least one host system having a first processor, a network interface for bi-directional communication between the host system and the user device, and at least one non-transitory computer readable memory storing a database and program logic;
   executing the program logic which causes the processor to generate first instructions for an input screen of an application displayable in a browser of the user device and send the first instructions to the user device via the network interface;
   responsive to receiving a text string at the host system, the program logic causes the host system to evaluate each layout stored in the database to generate and return at least one layout representing a possible design configuration for the text string by determining at least one breakpoint in the text string, each of the at least one breakpoint being whitespace between text characters or a new line, then determining text sections in the at least one layout that can accommodate an optimal variation of the text string, the optimal variation of the text string determined by looping through all text sections in the at least one layout, starting with a smallest, then recursively looping through groups of characters delimited by the at least one breakpoint in the text string, and attempting to fit those groups of characters into text sections of the at least one layout;

responsive to generating the at least one layout, the program logic causes the host system to generate second instructions for causing the user device to display the at least one generated layout on a layout screen displayable in the browser of the user device and send the second instructions to the user device via the network interface; and responsive to receiving confirmation of a selection of the at least one generated layout displayed on the layout screen, the program logic causes the host system to generate a renderable design of the selected at least one generated layout displayed on the layout screen.

8. The method of claim 7, wherein the host system recursively loops through the groups of characters delimited by the at least one breakpoint in the text string starting from an end of the text string working forward to a beginning of the text string when attempting to fit those groups of characters into text sections of the at least one layout.

9. The method of claim 7, wherein the host system recursively loops through the groups of characters delimited by the at least one breakpoint in the text string starting from a beginning of the text string working backward to an end of the text string when attempting to fit those groups of characters into text sections of the at least one layout.

10. The method of claim 7, wherein the host system separates the text string into individual elements formed by groups of characters, the text string separated at the at least one breakpoint, then recursively loops through the individual elements attempting to fit those individual elements, individually or in groups, into text sections of the at least one layout.

11. The method of claim 10, wherein the at least one layout generated includes at least one graphical element, each at least one graphical element being an individual element.

12. The method of claim 11, wherein the renderable design is an assisted design and the program logic further causes the host system to generate and send third instructions to the user device via the network interface, the third instructions designed to cause the application to open the assisted design in a design modification module of a customization screen on the user device, the design modification module allowing the user to modify each individual element of the assisted design separately.

\* \* \* \* \*